United States Patent [19]

Smith

[11] Patent Number: 5,042,256
[45] Date of Patent: Aug. 27, 1991

[54] TURBINE SHAFT FUEL PUMP

[75] Inventor: Raymond Smith, Monclova, Ohio

[73] Assignee: Teledyne Industries, Inc., Los Angeles, Calif.

[21] Appl. No.: 890,869

[22] Filed: Jul. 28, 1986

[51] Int. Cl.$^5$ .............................................. F02G 1/00
[52] U.S. Cl. ..................................................... 60/745
[58] Field of Search ................. 60/745, 737, 738, 740, 60/744

[56] References Cited

U.S. PATENT DOCUMENTS

| | | | |
|---|---|---|---|
| 2,492,672 | 12/1949 | Wood | 417/407 |
| 2,925,215 | 2/1960 | Weatherbee | 417/407 |
| 2,994,192 | 8/1961 | Eisele | 60/745 |
| 3,018,625 | 1/1962 | Bachle | 60/745 |
| 3,021,675 | 2/1962 | Schroeder | 60/745 |
| 3,932,988 | 1/1976 | Beaufrere | 60/737 |

Primary Examiner—Louis J. Casaregola
Assistant Examiner—T. Thorpe
Attorney, Agent, or Firm—Gifford, Groh, Sprinkle, Patmore and Anderson

[57] ABSTRACT

A fuel pump within the main shaft of a turbine engine comprises a fuel tube extending axially through the shaft, a first shaft wall and the second shaft wall spaced apart from each other at one end of the tube to define a flow passage therebetween, a plurality of substantially radially aligned vanes extending across the passageway, an annular cavity in fluid communication with the outlet of the vaned passageway and a plurality of circumferentially spaced injector nozzles in fluid communication with the annular cavity and opening into the combustion chamber of turbine engine. The pump vanes impart sufficient energy to the fuel to overcome friction losses in the injector nozzles and to overcome the pressure within the combustor chamber. In addition, the energy imparted to the fuel forms a fuel barrier which separates the combustor chamber pressure from pressure within the fuel tube. Fuel is delivered to the fuel tube by pumping and metering means which can be downsized from previously known fuel pump mechanisms since it only needs to meter a desired amount of fuel and provide pressure only to overcome friction losses in the flow path up to fuel tube within main shaft of the turbine.

3 Claims, 3 Drawing Sheets

TURBINE SHAFT FUEL PUMP

BACKGROUND OF THE INVENTION

I. Field of the Invention

The present invention relates generally to turbine engines and more particularly to a turbine engine construction having a hollow shaft through which fuel is delivered and pumped into the combustor chamber of the turbine engine.

II. Description of the Prior Art

In turbine engine constructions, it is well known that fuel pumps are used to direct a fuel into the combustor chamber of the turbine engine. Typically, the fuel pumps are driven by the turbine engine by means of an accessory gear box or other means for coupling the pump to the engine shaft. However, the weight and complexity of the drive mechanism substantially increases the size and bulk of the turbine engine. Moreover, energy losses caused by these mechanisms further decrease the efficiency of the turbine engine. Moreover, the numerous parts in the drive mechanisms are subjected to wear and require lubrication, periodic maintenance and repair.

Of course, it has also been known to use electric motors for driving the pumps but such motors require a separate or engine driven power source for actuating the motor to drive the pump. Moreover, size and weight of these motors can significantly affect the breadth or size of the turbine engine since they are often mounted to the turbine housing in close proximity to the pump. Moreover, regardless of the means used for driving the pump, the pump must provide sufficient pressure levels to overcome the system friction losses within the fuel passageways and sufficient pressure to inject the fuel into the combustor chamber against the force of the pressure caused by combustion within the combustor chamber. Since pressure requirements tend to increase the size and complexity of the previously known fuel pumps.

In addition, although it has been known to provide a fuel passageway through the center of the turbine shaft so that rotation of the shaft imparts a centrifugal force to the fluid to drive it outwardly from the center of the shaft, such fluid systems primarily rely on the pressure provided by a turbine driven pump to overcome the friction losses on the fuel passage and to overcome the pressure in the combustor chamber. As a result, previously known turbine shaft fuel supply systems do not supplant the need for powerful pumps and drive mechanisms and the problems inherent with those devices.

SUMMARY OF THE PRESENT INVENTION

The present invention overcomes the above mentioned disadvantages by providing a fuel pump within the main shaft of a turbine engine which provides a pressurized fuel supply with sufficient energy to inject the fuel into the combustor chamber of the turbine engine. As a result, an external fuel pump need be used only for supplying a metered amount of fuel necessary for efficient operation at a desired speed, with sufficient pressure to overcome friction losses in the conduits intermediate the supply source and the main shaft of the turbine engine. In addition, the fuel pump also provides a means for establishing a pressure barrier which separates pressure in the combustor chamber from the lower fuel pressure in the turbine shaft.

In general, the pump comprises a pair of shaft walls forming a passage therebetween which is provided with a plurality of vanes. The outermost or outlet ends of the vanes communicate with an annular cavity within the shaft which is also in fluid communication with injector nozzles directed toward the combustion chamber of the turbine engine In one embodiment of the present invention, the vanes are axially positioned in alignment with the injectors in order to minimize frictional losses in the flow path. In this embodiment, the vanes are shaped so that the vanes impart sufficient energy to the fuel to cause a circulating liquid ring in the annular cavity which acts as a pressure barrier between the combustion chamber and the fuel passageway in the turbine engine. A modification of this construction employs an annular fence, apertured ring or other means for forming a restricted gap in the annular cavity which controls the amount of fuel delivered to the injector nozzles. In any event, the vanes can be formed with different cross sectional shapes and positioned in various alignments within the scope of the present invention.

A further modification of the present invention comprises contoured first and second shaft walls which define an axial inlet portion of the fluid passageways as well as a radially extending outlet passage for the fluid passageway. Correspondingly shaped vanes extend across the flow passage formed between the first and second shaft walls The radially extending end portion of the fluid passage can be axially positioned in alignment with the injector nozzles in the manner discussed above, although the present invention also includes a modification where the outlet end of the vaned passageway communicates with an axially elongated passage intermediate the annular cavity and the outlet end of the vaned passage. The axially elongated passage serves as a further means for creating a pressure barrier between combustor chamber and the fuel supply within the passageway in the turbine shaft. In a further modification of the present invention, the axially elongated passageway includes communicating portions arranged at different radial levels in order to form positive liquid fuel seal in the radially outermost portion of the axial position. A still further modification of the present invention includes a hollow fuel passageway through the center of the turbine shaft that would be required for engines having two or more concentric shafts.

Thus, the present invention provides a fuel pump within the turbine shaft of the turbine engine to substantially reduce power required by pumps and associated devices necessary to inject fuel into the combustor chamber of the turbine engine. Moreover, with the fuel pump of the present invention, the size and complexity of the fuel pump for supplying a metered amount of fuel to the turbine engine can be substantially reduced. In addition, the pump provides a means for establishing a pressure barrier between the combustor chamber and the fuel delivery passages as well as a means for reducing the amount of energy which must be supplied by the metering fuel pump. In addition, the flow passages in the pump can be contoured to further condition the fuel as it is delivered to the injector nozzles for discharge into the combustion chamber. These and other advantages will be more clearly understood by reference to the detailed description.

BRIEF DESCRIPTION OF THE DRAWING

The present invention will be more clearly understood by reference to the following Detailed Description of a Preferred Embodiment of the present invention when read in conjunction with the accompanying drawing in which like reference characters refer to like parts throughout the several views and in which.

DETAILED DESCRIPTION OF A PREFERRED EMBODIMENT OF THE PRESENT INVENTION

Figure 1:
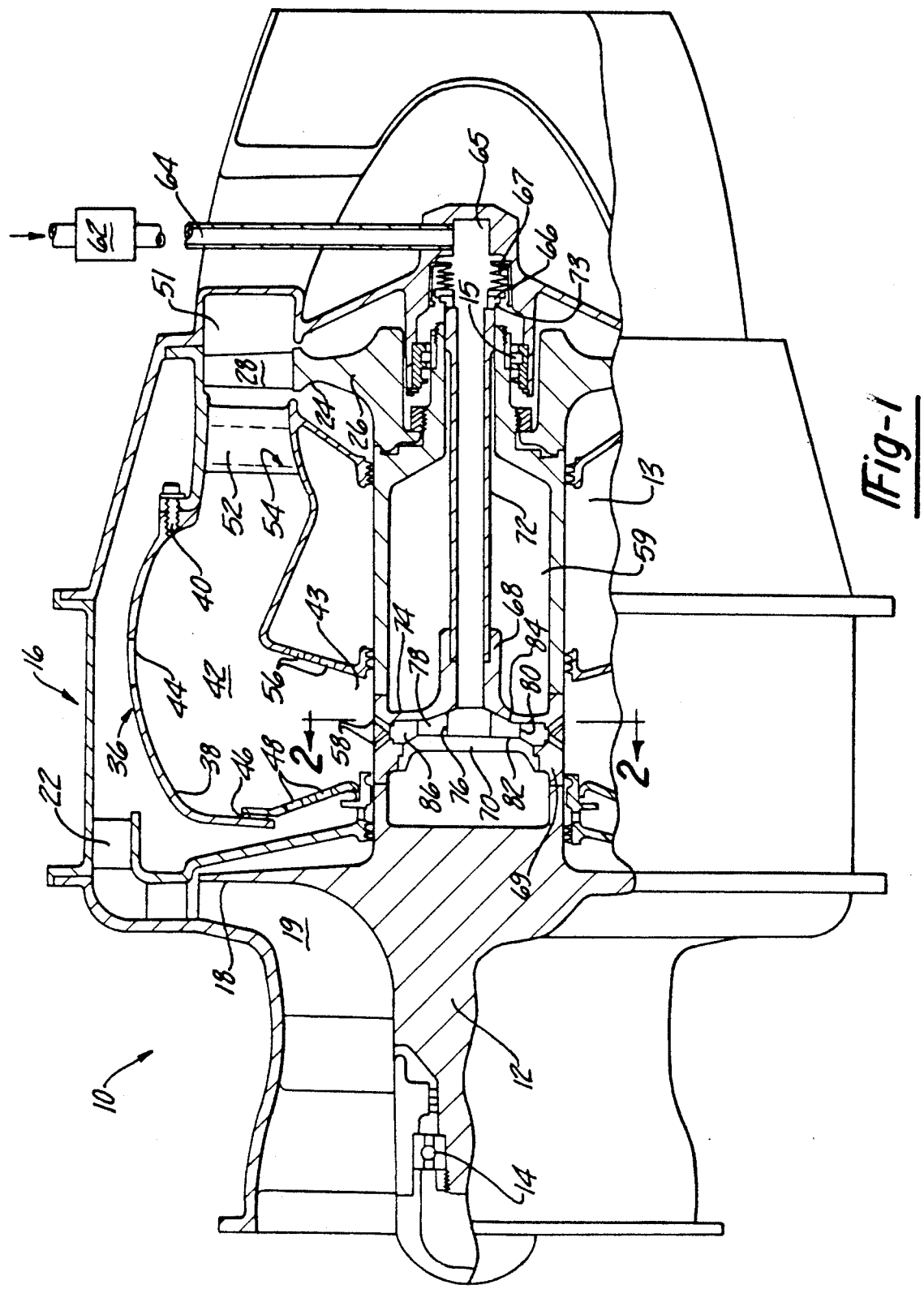
FIG. 1 is a longitudinal sectional view of a turbine engine construction according to the present invention.

Referring first to FIG. 1, a turbine engine 10 constructed according to the present invention is thereshown comprising a main shaft 12 rotatably mounted by bearings 14 and 15 in a support housing 16. The shaft includes a compressor 18 having a plurality of impeller vanes 19 which supplies pressurized air to the compressor outlet 22. The other end of the shaft 12 includes at least one turbine stage 24 having a disc 26 and a plurality of turbine blades 28 which rotate in unison with the shaft 12.

A combustor 36 is mounted within the housing 16 intermediate the compressor outlet 22 and the turbine stage 24. The combustor includes an outer annular shell 38 secured to the support housing 16 by appropriate means, such as the fastener connection shown at 40, to define an annular combustor chamber 42. The radially inner end 43 of the combustor is open to the periphery of the main shaft 12 near injector nozzles 58 as will be described in greater detail hereinafter. Pressurized air from the compressor outlet 22 enters the combustor chamber 42 through a plurality of openings 44, 46 and 48. In addition, the rear or outlet portion of the combustor faces a plurality of circumferentially spaced stator vanes 52 which are secured to the support housing 16 between the turbine stage 24 and the combustion chamber 42. The stator vanes 52 form a nozzle to direct fluid flow into the turbine stage 24. Pressurized air from the compressor outlet 22 passes through the openings 54 in the hollow stator vanes 52, and then enters the combustion chamber 42 through a plurality of openings 56.

A portion 13 of the main shaft 12 includes a hollow chamber 59 extending axially toward and to the rear end of the shaft. An elongated fuel tube 72 extends through the chamber 59 and is secured for rotation with the shaft 12. Fuel from the supply source (not shown) is delivered to the fuel pumping and metering means shown schematically at 62. The metered fuel supply enters the engine through a passageway 64 in fluid communication with the housing chamber 65 axially aligned with the fuel tube 72. Leakage of the fuel passing from housing chamber 65 into the rotating fuel tube 72 is prevented by conventional means such as the seal ring 66 resiliently urged against the annular seal interface 73 at the axial end of the fuel tube 72 by spring means 67.

The other end of the fuel tube 72 is mounted to the substantially annular housing portion 68 of a shaft ring portion 69 of the main shaft 12. The shaft ring 69 includes an annular peripheral portion formed with a plurality of circumferentially spaced fuel injector nozzles 58 which open into portion 43 of combustor chamber 42. The radially innermost ends of the injector nozzles 58 communicate with an annular cavity 86 formed between the shaft ring 69 and an end plate 70 secured across the forward end of the shaft ring 69. The end plate 70 includes a front end wall 82 which is spaced apart from a rear end wall 84 formed on the shaft ring 69 to define a fuel flow passage therebetween. A plurality of radial vanes 78 extend axially across the flow passage between the front end wall 82 and rear end wall 84. The locus of the radially inner ends of the vanes 78 forms a fuel pump inlet diameter 76 while the radially outermost ends of the blades define the pump outlet.

As metered fuel is pumped through the passageway 64 by pumping and metering means 62 and through the fuel tube 72, it enters the fuel pump inlet diameter 76 and passes through the space between the radial vanes 78 into the annular cavity 86. Fuel from the annular cavity 86 feeds the fuel injector nozzles 58 and the rotation of the vanes 78 provides sufficient energy to inject the fuel into the combustion chamber 42. Since it is advantageous to avoid filling the fuel injector nozzles 58 full of fuel to avoid damaging effects which could occur from fuel contaminants clogging fuel injector nozzles 58, pressure levels that exist in the combustor chamber 42 also pressurize the annular fuel cavity 86. The pumping action of the radial vanes 78 causes a pressure rise across the vanes which overcomes the pressure levels existing in the annular cavity 86 due to the pressure level in the combustion chamber 42 as well as the friction losses in the fuel injection nozzles 58.

Moreover, fuel entering the inner diameter 76 of the radial vanes 78 is generally in a vapor-liquid form that liquifies at or near the vane tips 80 due to the pumping action of the vanes 78. This pumping action forms a rotating liquid ring of fuel to provide a seal barrier between the pressure level in the annular cavity 86 and the pressure within the fuel tube 72. The radial depth of this liquid ring of fuel varies automatically as a function of the required fuel flow, pressure level and engine speed. Taking these considerations into account, the radial vanes 78 are constructed to have a tip diameter, locus of vane tips 80, which provides a work capacity at least equal to or, preferably, in excess of the work required to inject the fuel into the combustion chamber. The sizing of the radial vanes 78 permits the fuel to be supplied to the fuel pump inlet diameter 76 at a relatively low pressure level, thereby reducing the required fuel flow pressure and work requirements of the fuel pumping and metering means 62. The radial flow area at any radius R from the shaft centerline is defined as the product of the circumference of radius R and the axial spacing between the front end wall 82 and the rear wall 84. The desired radial fluid velocities then define the axial space and consequently the relative wall contour. Due consideration should be given to the vapor-liquid fuel mixture of the fuel pump inner diameter 76 and the requirement for a stable liquid ring at, or near, the vane tips 80.

Figure 2:
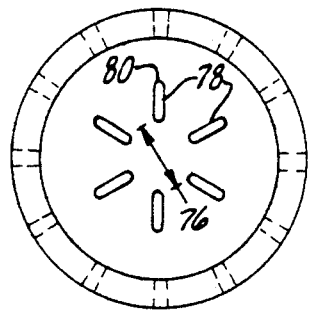
FIG. 2 is a fragmentary sectional view taken substantially along line 2—2 of FIG. 1.
Figure 4:
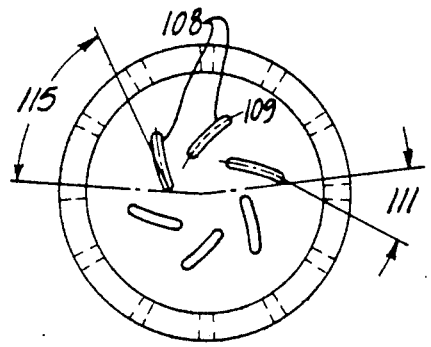
FIG. 4 is a view similar to FIG. 2 showing a further modification thereof.

The pumping efficiency of the vanes can be improved by adjusting the alignment of the vanes for fuel flow conditions where fuel entering the fuel pump inner diameter 76 is not rotating at shaft speed. Referring particularly now to FIG. 4, it can be seen that the straight radial vanes 78 shown in FIG. 2 can be replaced by a plurality of curved vanes 108 which extend substantially radially outwardly direction. The vanes can be contoured along any mean line shape such as is schematically illustrated at 109 to improve the pumping efficiency that is required by specific design variations of the passageway and shaft construction. The preferred vane means line angle 115 of the pump inlet and the tip angle 111 can be calculated from the velocity triangles with due consideration of the inlet incidence angles and tip exit slip conditions. The pump flow, generally, is not proportional to speed since it is throttled upstream by the fuel pumping and metering means 62. The inlet flow angles can then be optimized only over a limited speed-flow range and reflect a compromise at other speed-flow conditions. The exit tip angle 111, in all cases, can provide additional flexibility for adjusting the front end wall 82 and the rear end wall 84 since this angle influences the flow channel fluid velocity. The vane thickness can be further increased toward the tip which will also influence the relative flow velocity, however, the thicker tips will increase the strength of the circumferential flow striations entering the annular cavity 86. The axial spacing between the front end wall 82 and the rear end wall 84 tend to be very small in smaller engines, increasing the thickness of the vane tips will permit larger axial spacings thereby providing a configuration which is easier to manufacture.

Figure 3:
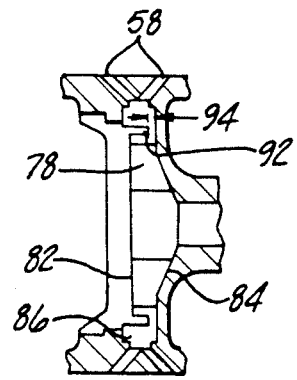
FIG. 3 is a fragmentary cross sectional view of a portion of the device shown in FIG. 1, but showing a modification thereof.

Referring now to FIG. 3, a modification to the pumping means shown in FIG. 1 is shown comprising an annular flow fence 92 extending outwardly from the front end wall 82. Flow fence 92 is positioned radially outwardly from the radial vanes 78 and provide a control gap 94 between the fence 92 and the rear end wall 84 to further condition the fuel flow entering the annular cavity 86 before the fuel passes through the fuel injector nozzles 58 into the combustion chamber 42. Of course, it will be understood that the annular fence 92 can be replaced by other means, such as an apertured ring, which forms a gap particularly adapted to provide flow characteristics desired for the fuel entering ejector nozzles 58.

Figure 5:
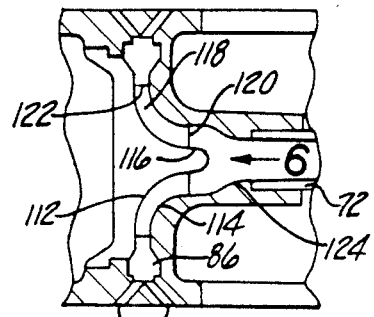
FIG. 5 is a fragmentary sectional view similar to FIG. 3 but showing a further modification thereof.

A further modification of the pump according to the present invention is shown in FIG. 5. The end plate 70 includes a contoured front end wall 112 defining a center body 116 extending in an axial direction along the main shaft 12. In addition, the shaft ring 69 includes contoured rear end wall 114 to provide a flow channel between the contoured front end wall 112, center body 116 and in the contoured rear end wall 114. A plurality of vanes 118 extend across the flow channel and wall portion 123 adjacent wall portion 114 of shaft ring 69 forms a contoured inlet pipe 124 upstream of the leading edge 120 of the vanes 118.

Figure 6A:
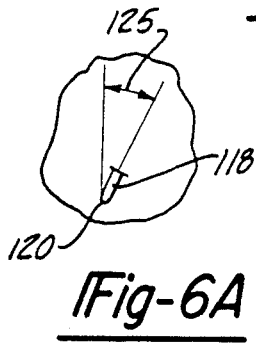
FIG. 6A is a fragmentary view taken substantially along the direction 6A shown in FIG. 6.
Figure 6:
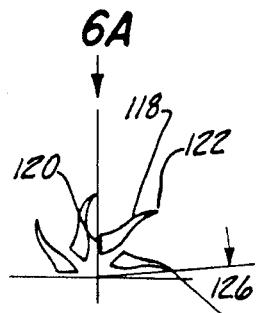
FIG. 6 is a fragmentary view taken substantially along the direction 6 shown in FIG. 5.

Moreover, as shown in FIG. 6, the vanes 118 are further contoured between the leading edge 120 and the trailing edge 122 to increase the efficiency of the pump operation. The desired leading edge inlet angle 125, as shown in FIG. 6A, can be calculated from the velocity triangles with due consideration for the inlet incidence angles. The preferred tip angle 126 can be calculated by taking into account the exit slip conditions and the desired channel flow velocities. These flow conditions are subject to the same types of compromises as previously discussed in conjunction with FIG. 4. As shown in FIG. 6, the thickness of each vane varies along the radial direction and the side surfaces are particularly configured in accordance with desired pumping action. In any event, the axial elongation of the vanes as well as the radial elongation of the vanes 118 enables the vanes to impart further energy to the fuel as it flows from the fuel tube 72 into the annular cavity 86 for exhaustion into the nozzles 58.

Figure 7:
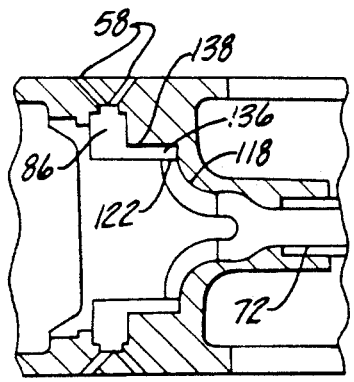
FIG. 7 is a view similar to FIG. 5 but showing a still further modification thereof.

Referring now to FIG. 7, a further modification of the pumping means utilizing the vane structure shown in FIG. 5 comprises an axial spacing between the trailing edge 122 of vanes 118 and the annular cavity 86. Fuel passes from the trailing edge or outlet 122 of the vanes 118 through an annular cavity 136 along the axially extending wall 138 formed on shaft ring 69. The annular passage 136 provides an elongated path for heat transfer to the fuel, and serves as a barrier between pressure created in the annular cavity 86 due to the combustion chamber and the low pressure in the fuel tube 72.

Figure 8:
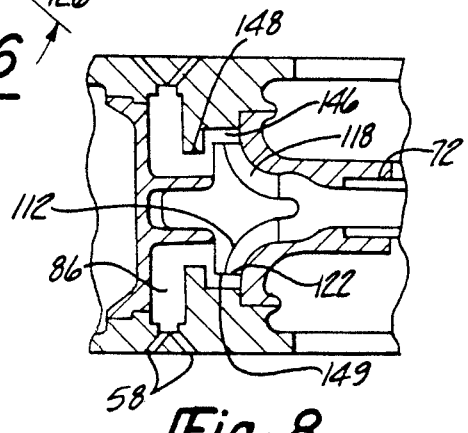
FIG. 8 is a view similar to FIG. 7 but showing an additional modification thereof.

As shown in FIG. 8, the trailing edge 122 of the vanes 118 is axially spaced from the annular cavity 86 and injectors 58, and the passageway communicating therebetween includes means for establishing a positive liquid fuel seal between the annular cavity 86 and the fuel tube 72. The diameter of the annular surface 148 is smaller than the diameter 149 of the contoured front end wall 112 while the trailing edge 122 of the vanes 118 may be less than, greater than or equal to the diameter 149. Such a structure provides a positive mechanical control of the radial depth of the liquid fuel ring formed in the passageway. Fuel discharged from the trailing edge 122 of the vanes 118 fills the annular chamber 146, and the fuel accumulates in the chamber until it reaches a radially inward position in which it can pass axially along the annular surface 148 and into the annular cavity 86. The accumulation of fuel in the annular cavity provides a positive liquid fuel seal between the pressure in the cavity 86 and the pressure within the fuel tube 72.

Figure 9:
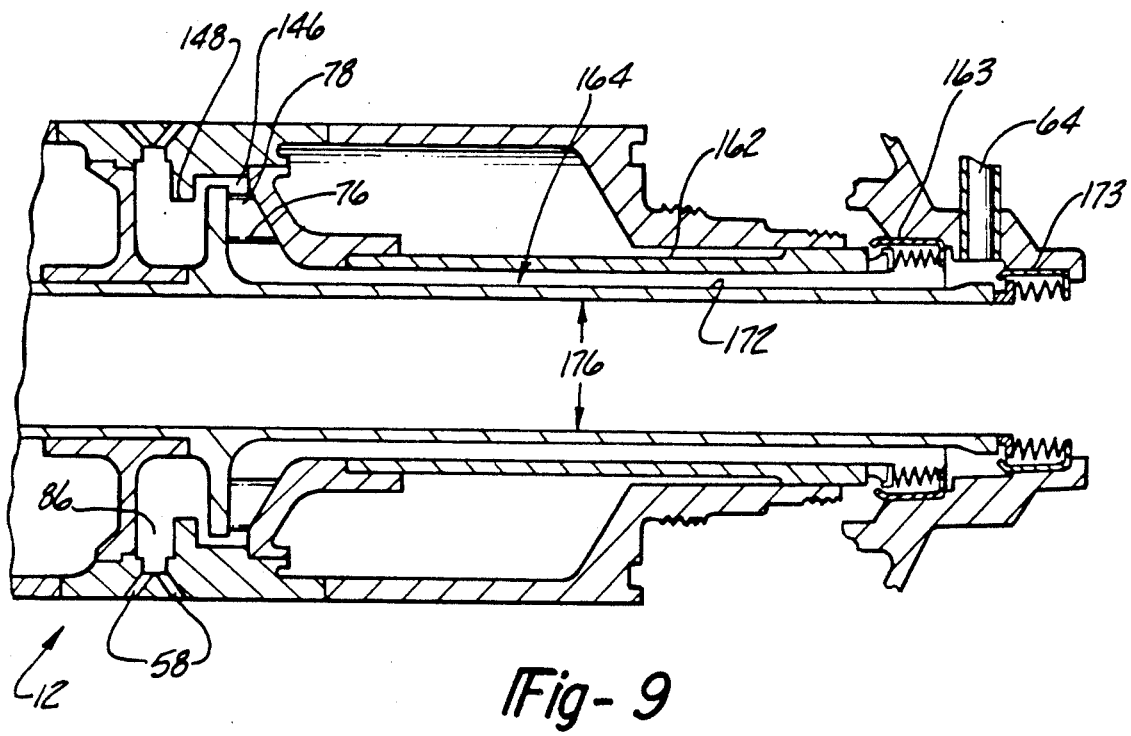
FIG. 9 is a fragmentary cross-sectional view of a portion of the device shown in FIG. 1 but showing an additional modification thereof.

Referring now to FIG. 9, a modification of the pumping means shown in FIG. 1 is shown comprising an outer fuel tube 162 having sealing mean 163 and an inner fuel tube 172 and sealing means 173. Fuel entering the engine through the passageway 64 flows axially along the mainshaft 12 through the axially disposed annular passageway 164 formed by the inner diameter of the outer fuel tube 162 and the outer diameter of the inner fuel tube 172, then enters the fuel pump inlet diameter 76 and passes through the space between the radial vanes 78, fills the annular chamber 146, as previously discussed in conjunction with FIG. 8, and the fuel accumulates in the chamber until it reaches a radially inward position in which it can pass axially along the annular surface 148 and into the annular cavity 86. The annular passageway 164 that transfers the fuel from the inlet passageway 64 axially along the mainshaft 12 to the pump inlet diameter 76 does not communicate with the inner diameter 176 of the inner fuel tube 172. This inner diameter 176 of the mainshaft 12 being separate from the fuel transfer and pumping means is desirable for some turbine engine constructions, such as those having two or more concentric shafts, the inner shafts then being unencumbered by the fuel system.

Figure 10:
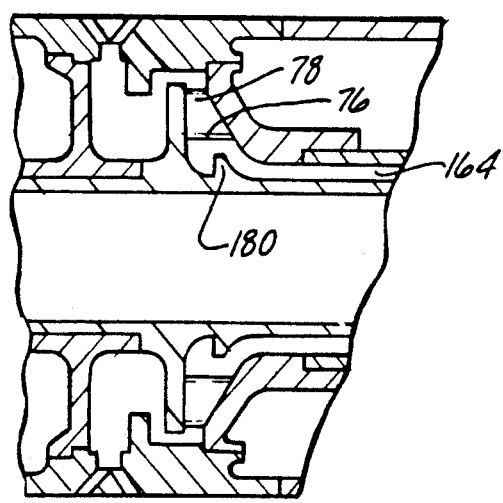
FIG. 10 is a fragmentary sectional view similar to FIG. 9 but showing still further modification thereof.

Referring now to FIG. 10, a further modification of the fuel transfer and pumping means shown in FIG. 9 comprises an annular deflector ring 180 to deflect the fuel flowing axially along the annular passageway 164 into a predominately radial direction before entering the fuel pump inlet diameter 76. This deflection of the fuel can potentially enhance the stability of the vapor-liquid fuel distribution at the inner diameter 76 of the radial vanes 78.

Having thus described our invention, many modifications thereto will become apparent to those skilled in the art to which it pertains without departing from the scope and the spirit of the present invention as defined in the appended claims.

I claim:

1. A turbine engine having a support housing, a shaft rotatably mounted in said support housing, an annular combustion chamber coaxial with said shaft and said support housing, said shaft having an axial passageway, injector nozzles aligned for discharging fuel into said combustion chamber, and means for pumping and metering a supply of fuel to said injector nozzles, said pumping and metering means comprising:

a flow passageway extending from a first end of said shaft axial passageway and to said injector nozzles, said flow passageway comprising an annular chamber formed between two axially spaced and radially inwardly extending walls in said shaft, said annular chamber is open to said axial passageway while a periphery of said annular chamber is open to said injector nozzles, and a plurality of pumping vanes disposed in said annular chamber, said vanes being secured to said shaft so that, upon rotation of said shaft, said vanes provide pressurized fuel from said passageway to said injectors.

2. The invention as defined in claim 1 wherein said flow passageway comprises an annular chamber formed between two axially spaced and radially inwardly extending walls in said shaft, wherein one axial end of said annular chamber is open to said first end of said shaft passageway while the other axial end of said annular chamber is open to said injector nozzles, and wherein a radially outer periphery of said vanes is disposed in said annular chamber.

3. The invention as defined in claim 2 wherein said plurality of pumping vanes originate from one of said walls.

* * * * *